United States Patent [19]
Shen et al.

[11] 3,846,553
[45] Nov. 5, 1974

[54] 3-SUBSTITUTED-2-PYRIDONES IN THE TREATMENT OF PAIN, FEVER OR INFLAMMATION

[75] Inventors: Tsung-Ying Shen; Gordon L. Walford; Bruce E. Witzel, all of Westfield, N.J.

[73] Assignee: Merck & Co., Inc., Rahway, N.J.

[22] Filed: Aug. 16, 1971

[21] Appl. No.: 172,319

Related U.S. Application Data

[63] Continuation of Ser. No. 881,922, Dec. 3, 1969, abandoned.

[52] U.S. Cl. .............................................. 424/263
[51] Int. Cl. .................................................. A61k 27/00
[58] Field of Search ...... 200/297 Z, 296 R; 424/263

[56] References Cited
OTHER PUBLICATIONS
Chem. Abst., Vol. 50-2576b (1956).

Smith et al., J. Org. Chem. 33(5), pp. 2083–2085, (1968).
Adams et al., J. Am. Chem. Soc., Vol. 71, pp. 1186–1195, (1949).
Smith et al., J. Org. Chem., Vol. 33, (5), pp. 2083–2085, (1968).
Ahmad et al., Chem. Abstracts, Vol. 50, p. 2576, 1956.

*Primary Examiner*—Stanley J. Friedman
*Attorney, Agent, or Firm*—Harry E. Westlake, Jr.; Mario A. Monaco; William H. Nicholson

[57] ABSTRACT

Novel 3-substituted-2-pyridone and 3-substituted-2-thiopyridone compounds are disclosed and the processes for preparing the same are described. These compounds exhibit anti-inflammatory properties and also possess an effective degree of anti-pyretic and analgesic activity.

8 Claims, No Drawings

3-SUBSTITUTED-2-PYRIDONES IN THE TREATMENT OF PAIN, FEVER OR INFLAMMATION

CROSS REFERENCE TO RELATED APPLICATIONS

This application is a continuation of Ser. No. 881,922, now abandoned.

SUMMARY OF THE INVENTION

This invention relates to new 3-substituted-2-pyridones and thiopyridones and describes processes for preparing these compounds. A method of treatment using a novel class of 2-pyridones and thiopyridones as medicinal agents and as therapeutic compositions is also described. The compounds of this invention exhibit anti-inflammatory activity and provide a method of treatment of inflammation. They also possess an effective degree of anti-pyretic and analgesic activity.

BACKGROUND OF THE INVENTION

There has been much research carried on in the past two decades for development of anti-inflammatory drugs. As a result, a great many new drugs have been synthesized. Most of these have been steroids of the 11-oxygenated-pregnane series.

We have found that the 3-substituted-2-pyridones and thiopyridones of this invention are non-steroidal in structure and are valuable anti-inflammatory agents.

DESCRIPTION AND PREFERRED EMBODIMENT

This invention relates to new chemical compounds which contain a phenyl or substituted-phenyl radical attached through a carbon or hetero linkage to the 3-position of a 2-pyridone or a 2-thiopyridone ring.

This invention also relates to a new method of treating inflammation and of therapeutic compositions, which comprises the administration to a human or animal such as a horse, dog, cat, sheep, etc. of a 3-substituted-2-pyridone or 3-substituted-2-thiopyridone compound having the structural formulae as shown in FIGS. I and II.

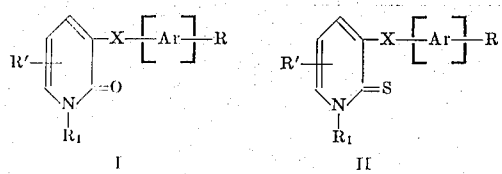

where
Ar is any benzenoid or non-benzenoid aromatic-like structure (preferably phenyl) containing one or more R substituents which may be at any position on the ring;
R is hydrogen, alkyl (preferably lower alkyl such as methyl, ethyl, propyl, etc.), halogen (such as fluoro, chloro, bromo, etc.), hydroxy, alkoxy (preferably lower alkoxy such as methoxy, ethoxy, propoxy, etc.), haloalkyl (preferably haloloweralkyl such as fluoromethyl, trichloromethyl, trifluoromethyl, etc.), aryl (preferably phenyl, naphthyl, substituted phenyl, such as hydroxyphenyl, halophenyl, alkoxyphenyl, etc.), nitro, amino, acylamino (such as acetylamino, etc.), alkylamino (preferably loweralkylamino such as methylamino, ethylamino, etc.), or dialkylamino (preferably diloweralkylamino such as dimethylamino, diethylamino, etc.),
$R'$ is hydrogen or alkyl (preferably loweralkyl such as methyl, ethyl, propyl, etc.)
X is
—$CH_2$—,
—$CH_2CH_2$—,
—CH=CH—,
—C≡C—,
—O—,
—S—,

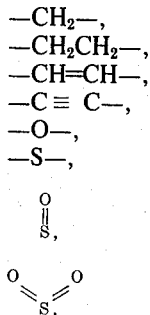

—NH— or
—NR"—;
$R_1$ is hydrogen, alkyl (preferably lower alkyl such as methyl, ethyl, propyl, etc.), alkenyl (preferably lower alkenyl such as vinyl, allyl, methallyl, etc.), alkynyl (preferably lower alkynyl such as ethynyl, methylbutynyl, etc.), aralkyl (preferably arloweralkyl such as benzyl, etc.), aryl (preferably phenyl or substituted phenyl such as hydroxyphenyl, halophenyl, anisyl, etc.), hydroxyalkyl (preferably hydroxyloweralkyl such as hydroxyethyl, hydroxypropyl, etc.), aminoalkyl (preferably aminoloweralkyl such as aminomethyl, aminoethyl, etc.) or dialkylaminoalkyl (preferably diloweralkylaminoloweralkyl such as diethylaminoethyl, etc.); and
$R''$ is alkyl (preferably loweralkyl such as methyl, ethyl, etc.), aralkyl (preferably arloweralkyl such as benzyl, etc.) or acyl (such as acetyl, etc.).

The more preferred compounds for a method of treating inflammation and for use in therapeutic compositions embrace those compounds of structural formulae I and II
where
Ar is phenyl;
R is
hydrogen,
alkyl,
halogen,
hydroxy,
alkoxy,
haloalkyl,
nitro,
amino,
alkylamino or
dialkylamino;
$R'$ is hydrogen;
X is
—CH=CH—,
—O—
—S—,

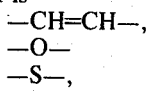

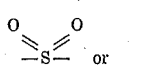  or

—NH—; and
$R_1$ is
hydrogen,
alkyl, aralkyl,
aryl or
dialkylaminoalkyl.

The most preferred compounds for treating inflammation and for use as therapeutic compositions embrance those compounds of structural formula III:

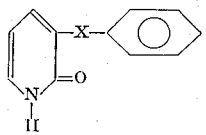

III where
X is
   —CH=CH—,
   —O—,
   —S—,

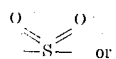

or

—NH—.

This invention further describes a new class of chemical compounds of structural formulae IV and V:

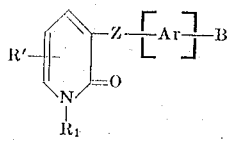 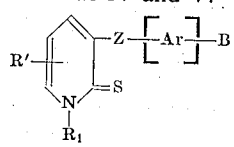

IV    V where
Ar is any benzenoid or non-benzenoid aromatic-like structure (preferably phenyl) containing one or more R substituents which may be at any position on the ring;
B is hydrogen, alkyl (preferably lower alkyl such as methyl, ethyl, propyl, etc.), halogen (such as fluoro, chloro, bromo, etc.), hydroxy, alkoxy (preferably lower alkoxy such as methoxy, ethoxy, propoxy, etc.), haloalkyl (preferably haloloweralkyl such as fluoromethyl, trichloromethyl, trifluoromethyl, etc.), aryl (preferably phenyl, naphthyl, substituted phenyl, such as hydroxyphenyl, halophenyl, alkoxyphenyl, etc.), nitro, amino, acylamino (such as acetylamino, etc.), alkylamino (preferably loweralkylamino such as methylamino, ethylamino, etc.) or dialkylamino (preferably diloweralkylamino such as dimethylamino, diethylamino, etc.);
R' is hydrogen or alkyl (preferably lower alkyl such as methyl, ethyl, propyl, etc.);
Z is
   —CH$_2$—,
   —CH$_2$CH$_2$—,
   -CH=CH,
   -C≡C,
   -O-,
   -NH- or
   -NR''-;
R$_1$ is hydrogen, alkyl (preferably lower alkyl such as methyl, ethyl, propyl, etc.), alkenyl (preferably lower alkenyl such as vinyl, allyl, methallyl, etc.), alkynyl (preferably lower alkynyl such as ethynyl, methylbutynyl, etc.), aralkyl (preferably arloweralkyl such as benzyl, etc.), aryl (preferably phenyl or substituted phenyl such as hydroxyphenyl, halophenyl, anisyl, etc.), hydroxyalkyl (preferably hydroxyloweralkyl such as hydroxyethyl, hydroxypropyl, etc.), aminoalkyl (preferably aminoloweralkyl such as aminomethyl, aminoethyl, etc.) or dialkylaminoalkyl (preferably diloweralkylaminoloweralkyl such as diethylaminoethyl, etc.); and
R'' is alkyl (preferably lower alkyl such as methyl, ethyl, etc.), aralkyl (preferably arloweralkyl such as benzyl, etc.) or acyl (such as acetyl, etc.).

The more preferred compounds of this invention embrace those compounds of structural formulae IV and V where
Ar is phenyl;
B is
   hydrogen,
   alkyl,
   halogen,
   hydroxy,
   alkoxy,
   haloalkyl,
   nitro,
   amino,
   alkylamino or
   dialkylamino;
R' is hydrogen;
Z is
   —CH$_2$—,
   —CH=CH—,
   —O— or
   —NH—; and
R$_1$ is
   hydrogen,
   alkyl,
   aralkyl,
   aryl or
   dialkylaminoalkyl.

The most preferred compounds of this invention embrace those compounds of structural formula VI:

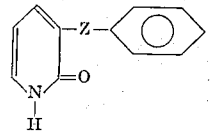

VI where
Z is
   —CH$_2$—,
   —CH=CH—,
   —O— or
   —NH—.

It is well known in the pharmacological arts that non-toxic acid addition salts of pharmacologically active amine compounds do not differ in activities from their free base. The salts merely provide a convenient solubility factor.

The amines of this invention may be readily converted to their non-toxic acid addition salts by customary methods in the art. The non-toxic salts of this invention are those salts the acid component of which is pharmacologically acceptable in the intended dosages; such salts would include those prepared from hydrochloric acid, hydrobromic acid, sulfuric acid, nitric acid, phosphoric acid, methane sulfonic acid, acetic acid, propionic acid, oxalic acid, glycolic acid, lactic acid, salicylic acid, etc.

It will further be appreciated by one skilled in the art that the following radicals may be employed in the practice of this invention where Ar is naphthyl;

R is alkenyl (preferably lower alkenyl such as vinyl, allyl, etc.), acyl (such as acetyl, propionyl, benzoyl, etc.), cyano, carboxy, carboalkoxy (preferably carboloweralkoxy such as carbomethoxy, carboethoxy, etc.), carbamyl, dialkylsulfamyl (preferably diloweralkylsulfamyl such as dimethylsulfamyl), acyloxy (such as acetoxy, propionoxy, etc.), mercapto, alkylthio (preferably lower alkylthio such as methylthio, ethylthio, etc.), alkylsulfonyl (preferably lower alkylsulfonyl such as methylsulfonyl), alkylsulfinyl (preferably lower alkylsulfinyl such as methylsulfinyl), sulfonamido, sulfinamido, alkylaminoalkyl (preferably loweralkylaminoloweralkyl such as methylaminomethyl, ethylaminoemthyl, etc.), hydroxyalkyl (preferably hydroxyloweralkyl such as hydroxymethyl, hydroxyethyl, hydroxypropyl, etc.), alkoxyalkyl (preferably loweralkoxyloweralkyl such as methoxymethyl, methoxyethyl, ethoxyethyl, ethoxypropyl, etc.), mercaptoalkyl (preferably mercaptoloweralkyl such as mercaptomethyl, mercaptoethyl, etc.), alkylmercaptoalkyl (preferably loweralkylmercaptoloweralkyl such as methylmercaptomethyl, ethylmercaptoethyl, ethylmercaptopropyl, etc.), aralkyl (such as benzyl, phenethyl, etc.), aryloxy or aralkoxy; and $R_1$ is aralkenyl (preferably arloweralkenyl such as phenylpropenyl, phenylbutenyl, etc.); and R' is alkenyl (preferably lower alkenyl such as vinyl, allyl, methallyl, etc.), alkynyl (preferably lower alkynyl such as ethynyl, methyl butynyl, etc.), aryl (preferably phenyl or substituted phenyl such as tolyl, halophenyl, anisyl, etc.), aminoalkyl (preferably aminoloweralkyl such as aminomethyl, aminoethyl, etc.), dialkylaminoalkyl (preferably diloweralkylaminoloweralkyl such as diethylaminoethyl, etc.) or aralkenyl (preferably arloweralkenyl such as phenylpropenyl, phenylbutenyl, etc.).

The compounds of formulae VII and VIII

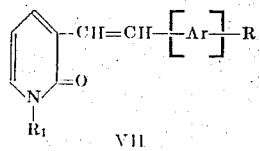 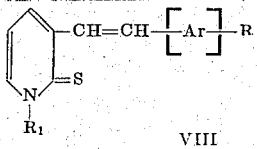

where Ar, R and $R_1$ are as defined above, can exist as geometric isomers. For example, 3-styryl-2[1H]pyridone can exist in a cis form in which the aryl ring and the pyridone ring are on the same side of the double bond, and a trans form in which the aryl and pyridone rings are on opposite sides of the double bond. It is to be understood that the various geometric isomers of formulae VII and VIII fall within the scope of this invention.

Representative compounds of this invention are as follows:

3-phenxoy-2[1H]pyridone
3-(p-chlorophenoxy)-2[1H]pyridone
3-(p-nitrophenoxy)-21H]pyridone
3-benzyl-2[1H]pyridone
1-methyl-3-phenoxy-2[1H]pyridone
4-methyl-3-phenoxy-2[1H]pyridone
cis-3-styryl-2[1H]pyridone
trans-3-styryl-2[1H]pyridone
3-(N-phenylbenzamido)-2[1H]pyridone
3-anilino-2[1H]pyridone
trans-3-(o-chlorostyryl)-2[1H]pyridone
1-(β-dimethylaminopropyl)-3-anilino-2[1H]pyridone
3-(o-tolyloxy)-2[1H]pyridone
3-(p-trifluoromethylphenoxy)-2[1H]pyridone
3-(o-methylanilino)-2[1H]pyridone
3-phenylthio-2[1H]pyridone
1-acetyl-3-benzyl-2[1H]pyridone
1-phenyl-3-benzyl-2[1H]pyridone
1-dimethylaminoethyl-3-phenoxy-2[1H]pyridone
3-phenoxy-2[1H]thiopyridone
3-(o-tolyloxy)-2[1H]thiopyridone
3-(p-nitrobenzoyl)-2[1H]thiopyridone
3-(p-fluorostyryl)-2[1H]thiopyridone
3-(p-chlorophenylsulfonyl)-2[1H]pyridone
3-(phenylsulfinyl)-2[1H]pyridone It is further understood that the compounds of this invention may exist as various tautomeric structures, particularly when $R_1$ is H, such as:

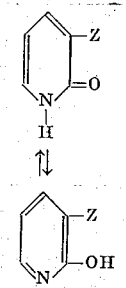

where Z is —X—[Ar]—R. These tautomeric compounds are also included within the scope of this invention.

A preferred embodiment of this invention is a method of treating a disease which is symtomatically characterized by pain, fever and/or inflammation which comprises the administration in dosage unit form of between about 5 and 500 mg. of the pyridone or thiopyridone compound per day. On a kilogram basis, it is preferred to utilize between about 0.5 mg./kg. and 70 mg./kg. per day of the pyridones or thiopyridones of this invention.

In view of the fact that the novel compounds of this invention exercise anti-inflammatory, analgesic and anti-pyretic activity, in general they are indicated for a wide variety of mammalian conditions where one or more of the symptoms of inflammation, fever and pain are manifested. Exemplary of such conditions are rheumatic diaseases, for example, rheumatoid arthritis, osteoarthritis and other degenerative joint diseases, psoriatic arthritis, ankylosing spondylitis, gout and rheumatic fever; soft-tissue rheumatism, for example, tendinitis, periarthritis and periostitis; acute muscular rheumatism, for example, sciatica and the like; treatment of pain after fractures, pain and inflammation associated with dental surgery, and the like, human and veterinary disease conditions exhibiting the foregoing symptoms requiring the use of an anti-inflammatory, analgesic and/or anti-pyretic pharmaceutical composition.

The compounds of this invention may be in a form suitable for oral use, for example, as tablets, aqueous or oil suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents, in order to provide a pharmaceutically elegant and palatable preparation. Tablets which contain the active pyridone and thiopyridone ingredient in admixture with non-toxic pharmaceutically acceptable excipients are suitable for the manufacture of tablets. These excipients may be, for example, inert diluents, for example, calcium carbonate, sodium carbonate, lactose, calcium phosphate or sodium phosphate; granulating and disintegrating agents, for example, maize starch or alginic acid; binding agents, for example, starch, gelatin or acacia; and lubricating agents, for example, magnesium stearate, steric acid or talc. The tablets may be uncoated or they may be coated by known techniques to delay disintegration and absorption in the gastrointestinal tract and thereby provide a sustained action over a longer period.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with an oil medium, for example, arachis oil, liquid paraffin or olive oil.

Aqueous solutions containing the active pyridone and thiopyridones form a further embodiment of this invention. Excipients suitable for aqueous suspensions, may be employed if desired. These excipients are suspending agents, for example, sodium carboxymethylcellulose, methylcellulose, hydroxypropylmethylcellulose, sodium alginate, polyvinylvyrrolidone, gum tragacanth and gum acacia; dispersing or wetting agents may be a naturally occurring phosphatide, for example, lecithin; or condensation products of an alkylene oxide with fatty acids, for example, polyoxyethylene stearate; or condensation products of ethylene oxide with long-chain aliphatic alcohols, for example, heptadecaethyleneoxy-cetanol; or condensation products of ethylene oxide with partial esters derived from fatty acids and a hexitol, for example, polyoxyethylene sorbitol mono-oleate; or condensation products of ethylene oxide with partial esters derived from fatty acids and hexitol anhydrides, for example, polyoxyethylene sorbitan mono-oleate. The said aqueous suspensions may also contain one or more preservatives, for example, ethyl, or n-propyl, p-hydroxy benzoate, one or more coloring agents, one or more flavoring agents, and one or more sweetening agents, such as sucrose.

Oily suspensions may be formulated by suspending the active ingredient in a vegetable oil, for example, arachis oil, olive oil, sesame oil or coconut oil, or in a mineral oil, such as liquid paraffin. The oily suspensions may contain a thickening agent, for example, beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example, sweetening, flavoring and coloring agents, may also be present.

The compounds of this invention may also be in the form of oil-in-water emulsions. The oily phase may be a vegetable oil, for example, olive oil or arachis oils, or a mineral oil, for example, liquid paraffin or mixtures of these. Suitable emulsifying agents may be naturally occurring gums; for example, gum acacia or gum traqacanth, naturally occurring phosphatides, for example, soya bean lecithin, and esters of partial esters derived from fatty acids and hexitol anhydrides, for example, sorbitan mono-oleate, and condensation products of the said partial esters with ethylene oxide, for example, polyoxyethylene sorbitan mono-oleate. The emulsions may also contain sweetening and flavoring agents.

Syrups and elixirs may be formulated with sweetening agents, for example, glycerol, sorbitol or sucrose. Such formulations may also contain a demulcent, a preservative and flavoring and coloring agents. The pharmaceutical compositions may be in the form of a sterile injectable preparation, for example, as a sterile injectable aqueous suspension. This suspension may be formulated according to the known art using those suitable dispersing or wetting agents and suspending agents which have been mentioned above. The sterile injectable preparation may also be a sterile injectable solution or suspension in a non-toxic parenterally acceptable diluent or solvent, for example, as a solution in 1:3-butane diol.

The pyridones and thiopyridones of this invention may also be in the form of suppositories for rectal administration of the drug. These can be prepared by mixing the drug with a suitable non-irritating excipient which is solid at ordinary temperatures, but liquid at the rectal temperature and will therefore melt in the rectum to release the drug. Such materials are cocoa butter and polyethylene glycols.

Further, these compounds may be tableted or otherwise formulated so that for every 100 parts by weight of the composition, there are present between 5 and 95 parts by weight of the active ingredient, and preferably between 25 and 85 parts by weight of the active ingredient. The dosage unit form will generally contain between about 100 mg. and about 500 mg. of the active ingredient of the formula stated above.

From the foregoing formulation discussion, it is apparent that the compounds of this invention can be administered orally, parenterally, topically and rectally. The term parenteral as used herein includes subcutaneous injection, intravenous, intramuscular, or intrasternal injection or infusion techniques.

The dosage regimen in carrying out the methods of this invention is that which insures maximum therapeutic response until improvement is obtained and thereafter is the minimum effective level which gives relief. Thus, in general, the dosages are those that are therapeutically effective in the treatment of disease conditions or symptoms, such as inflammation, pain and fever. In general, the daily dose can be between about 0.5 mg./kg. and 70 mg./kg., bearing in mind, of course, that in selecting the appropriate dosage in any specific case, consideration must be given to the patient's weight, general health, age, and other factors which may influence response to the drug.

It is expected that the pyridones and thiopyridones of this invention will generally be administered in dosage units of between 5 and 500 mg. of active ingredient. Preferred compositions for ease of administration are in oral dosage unit form, for example, tablets or capsules, containing between 25 and 500 mg. of a pyridone or thiopyridone of this invention.

The compounds of this invention may be conveniently prepared by the following general method.

Treatment of the 3-substituted pyridine with peroxide, such as hydrogen peroxide, in an acidic medium results in the 3-substituted pyridine N-oxide. This may then be rearranged by heating in the presence of an anhydride, such as acetic anhydride, to the 3-substituted-2[1H]pyridone compound (Ia). This reaction sequence may be represented by the following reaction equation:

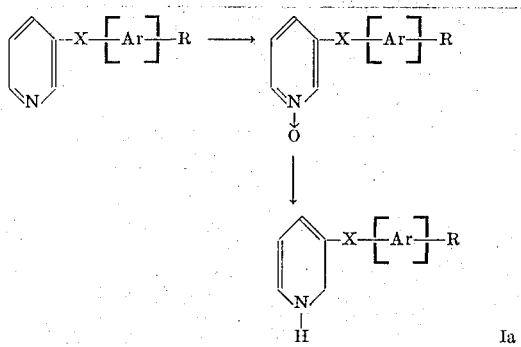

where Ar, R and X are as defined above.

Reaction of the 2-pyridone compounds with a strong base such as sodium hydride activates the 1-nitrogen. Addition of an aliphatic or aromatic agent such as an aliphatic tosylate or halide results in the N-substituted products (Ib). The following equation illustrates this reaction:

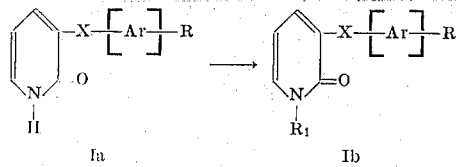

where Ar, R and X are as defined above and $R_1$ is as described above, less hydrogen.

The 3-substituted-2[1H]thiopyridones of this invention can be prepared from the corresponding 3-substituted-2[1H]pyridones by heating with $P_2S_5$.

The reaction can be carried out on the compounds which are unsubstituted at the 1-position (Ia) to give the 3-substituted-2[1H]thiopyridones (IIa), which can then be N-substituted (IIb) if desired. The products can also be prepared from those compounds which are already substituted at the 1-position (Ib) to give the N-substituted-thiopyridones (IIb).

These reactions are represented by the following equations:

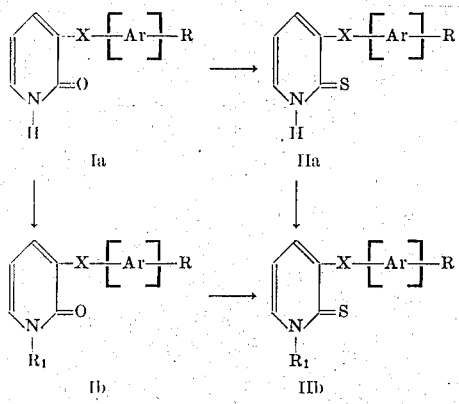

When a R' substituent is desired on the pyridone ring the above reactions may be used starting with the appropriate starting material.

The starting materials of this invention are either known compounds of their method of preparation is described in the examples of this specification. Appropriate references to known procedures in the literature are included.

The product amines of this invention may be readily converted to their non-toxic acid addition salts by customary methods in the art in order to provide a convenient solubility factor. The non-toxic salts of this invention comprise those salts containing acid components which are pharmacologically acceptable in the intended dosages. Such salts would include those prepared from hydrochloric acid, hydrobromic acid, sulfuric acid, nitric acid, phosphonic acid, methane sulfonic acid, acetic acid, propionic acid, glycolic acid, lactic acid, salicylic acid, etc.

Appropriately desired end-products having various R substituents can be prepared using suitable reactions in order to convert one R group to another. Thus, for example, a nitro can be reduced to an amino group which can then be mono- or di-alkylated. A hydroxy compound can be prepared by demethylation of a methoxy substituent or through diazotization of an amino group. A chloro compound may be prepared by diazotization of an amino group. These reactions can be carried out at any convenient step of the synthesis.

The following are a group of detailed examples which show the preparation of desired compounds of this invention. They are to be construed as illustrations of the invention and not as limitations thereof.

EXAMPLE 1

3-Phenoxypyridine

3-Hydroxypyridine (15.2 g., 0.16 mole) and potassium hydroxide (9.0 g., 0.16 mole) are heated together at 150°C. under a gentle sweep of nitrogen to drive off water. Then, an additional 3.8 g. (0.04 mole) of 3-hydroxypyridine is added, followed by bromobenzene (47.1 g., 0.30 mole) and cupric carbonate (0.40 g.). The nitrogen inlet is replaced by an air condenser, and the mixture is heated at 150°C. for 3 hours, and then at 180°C. for 15 hours. The black mixture is diluted with water (250 ml.), made strongly alkaline (KOH, 3.3 g., 0.06 mole), and subjected to steam distillation. The distillate (ca. 1.71.) is extracted with ether, the ethereal phase dried (anhyd. $MgSO_4$), and evaporated. The residue is fractionated in vacuo to obtain 3-phenoxypyridine (b.p. 101°–103°/0.55 mm.).

EXAMPLE 2

3-Phenoxypyridine-N-Oxide

A mixture containing 3-phenoxypyridine (8.6 g., 0.05 mole), glacial acetic acid (30 ml.), and aqueous 30% $H_2O_2$ (5 ml.) is heated in an oil-bath at 75°C. for 3 hours. An additional 3.6 ml. of peroxide solution is then added, and heating is continued for 12 hours. The solution is concentrated in vacuo to a volume of ca. 10 ml.; water (10 ml.) is added, and the concentration repeated. Water (10 ml.) is again added, followed by small portions of sodium bisulfite, with shaking, until the starch-iodide test for hydrogen peroxide is negative; The mixture is again concentrated to ca. 10 ml. The residue is treated with chloroform (50 ml.), and then with solid sodium carbonate, in small portions with shaking, until carbon dioxide is no longer evolved. The mixture is then dried over anhydrous magnesium sulfate, filtered, and evaporated in vacuo. The residue, a viscous yellow oil (ca. 9.4 g.) is induced to crystallize by trituration with ether and then is recrystallized from a mixture of methylene chloride and ether to give 3-phenoxypyridine-N-oxide (m.p. 78°–80°).

EXAMPLE 3

3-Phenoxy-2[1H]Pyridone

A solution of 3-phenoxypyridine-N-oxide (2.8 g.) in acetic anhydride (15 ml.) is heated at reflux for 5 hours. The bulk of the solvent is removed by evaporation in vacuo, and the dark oily residue treated with water (25 ml.). The aqueous mixture is heated on the steam-bath for 1 hour, and then allowed to stand overnight at room temperature. The dark organic phase partially crystallizes; the mixture if filtered, and the gummy black solid washed on the filter by slurrying with acetone. Much of the colored material is washed away by this procedure, and there remains on the filter 1.3 g. of grayish crystals. Recrystallization from acetone gives 3-phenoxy-2[1H]pyridone (m.p. 158.5°–160°C.).

EXAMPLE 4

3-Benzylpyridine

The reduction of 3-benzoylpyridine (10.1 g.) with red phosphorous (2.5 g.) and hydriodic acid (50 ml.) is carried out according to the procedure of A. E. Tschitschibabin, Ber., 36, 2,711 (1903). The reaction mixture is made strongly alkaline by the addition of concentrated sodium hydroxide solution, and the yellow oil which separates is extracted into ether (2 × 50 ml.). The combined ethereal extracts are washed with water (2 × 25 ml.), dried over anhydrous $MgSO_4$, and evaporated in vacuo. The residue crystallizes in long needles to obtain 3-benzylpyridine (m.p. 28°–31°).

EXAMPLE 5

3-Benzylpyridine-N-Oxide

The 3-benzylpyridine (8.5 g., 0.05 mole) is treated with acetic acid and 30 percent aqueous hydrogen peroxide (8.6 ml.) by the procedure of Example 2.

The work-up affords 3-benzylpyridine-N-oxide as a viscous pale yellow oil which can not be induced to crystallize. For purposes of characterization, a sample is converted to 3-benzylpyridine-N-oxide picrate and recrystallized from alcohol (m.p. 133°–134°).

EXAMPLE 6

3-Benzyl-2[1H]Pyridone

The rearrangement of 3-benzylpyridine-N-oxide (3.7 g., 0.02 mole) in acetic anhydride (20 ml.) is carried out as described in Example 3. Following hydrolysis with water (25 ml.), there is obtained a very dark oil which does not solidify on standing. The water is decanted, and the dark residue taken up in methylene chloride (50 ml.). The aqueous solution is extracted with methylene chloride (25 ml.), the organic solutions combined, dried over anhydrous $MgSO_4$, and evaporated in vacuo. The residue is a dark brown syrup which on trituration with a little ether gives solid material; this is transferred to a sintered-glass funnel, and washed thoroughly by slurrying with ether. The solid is twice recrystallized from acetone to give 3-benzyl-2[1H]pyridone (m.p. 160°–161.5°).

EXAMPLE 7

3-Anilinopyridine

A. N-(3-prioyl)anthranilic acid

A mixture containing anthranilic acid (4.1 g.), 3-bromopyridine (6.3 g.), anhydrous potassium carbonate (4 g.), copper powder (200 mg.), and nitrobenzene (25 ml.) is heated for 3 hours at reflux. The black mixture is cooled, treated with water (200 ml.), and then extracted with ether (2 × 50 ml.). Acidification of the aqueous phase with acetic acid gives an immediate dark precipitate which is collected by filtration, and washed thoroughly with water and ethanol. This solid is then recrystallized from ethanol to obtain N-(3-pyridyl)anthranilic acid (m.p. 237°–8°).

B. 3-Anilinopyridine

N-(3-Pyridyl)anthranilic acid (4.0 g.) is heated in a Wood's metal bath at 250° until evolution of $CO_2$ subsides (ca. ¾ hr.). The temperature is then raised during ca. ¼ hour to 290°–295°, held in that range for a few minutes, and then allowed to cool to room temperature. The residue is taken up in diluted hydrochloric acid (conc. HCl, 5 ml.; water, 10 ml.), the solution warmed briefly with charcoal (0.5 g.), filtered by gravity, and the dark green filtrate added, dropwise, with stirring and ice-cooling to an excess of 2.5 N aqueous sodium hydroxide (30 ml.). The precipitated greenish amorphous solid is collected by filtration and washed thoroughly with water and subjected to sublimation in vacuo to obtain 3-anilinopyridine (m.p. 140°–1°).

EXAMPLE 8

N-3-Pyridylbenzanilide

To a suspension of sodium hydride (515 mg. of 56 percent dispersion in mineral oil = 288 mg. (0.012 mole) of sodium hydride) in dry dimethylformamide (20 ml.) is added a solution of 3-anilinopyridine (1.70 g., 0.010 mole) in dimethylformamide (10 ml.), the addition carried out during 35 minutes at room temperature, with stirring, and exclusion of air and moisture (dry nitrogen sweep). The mixture is then stirred for an additional 60 minutes at room temperature under nitrogen. The mixture is then cooled by submersion in an ice-bath, and to it is added a solution of benzoyl chloride (1.69 g., 0.012 mole) in dry dimethylformamide (10 ml.), dropwise, during 35 minutes with continued stirring. When the addition is complete, the mixture is stirred for 16 hours at room temperature under nitrogen.

The reaction mixture is poured into a mixture of ether (125 ml.), acetic acid (1.0 ml.) and ice-water (200 ml.). The layers are separated, and the aqueous phase is extracted twice more with ether. The combined ether extracts are washed with water and dried over anhydrous $MgSO_4$. The dried ether extracts are evaporated to dryness in vacuo, and the residue triturated with ether to give the crystalline amide which is recrystallized as follows: it is dissolved in the minimum quantity of boiling methanol, the solution filtered hot by gravity, and diluted with ether. After standing overnight in the cold, there is recovered fine, white needles of N-3-pyridylbenzanilide (m.p. 158°–159°).

EXAMPLE 9

3-(N-Phenylbenzamido)pyridine 1-oxide

To a solution of N-3-pyridylbenzanilide (550 mg.) in glacial acetic acid (2 ml.) maintained at 70° in an oil-bath, is added 30 percent aqueous $H_2O_2$ (0.20 ml.) An additional 0.15 ml. of peroxide solution is added after 3 hours, and then the reaction mixture is kept overnight at 70°. After evaporation of volatile material in vacuo, the yellow oily residue is induced to solidify by trituration with ether containing a few drops of acetone. There is recovered 460 mg. of creamy white solid which is recrystallized from acetone/ether to obtain 3-(N-phenylbenzamido)pyridine 1-oxide (m.p. 151°–152°).

EXAMPLE 10

3-(N-Phenylbenzamido)-2[1H]Pyridone 3-(N-Phenylbenzamido)pyridine 1-oxide (871 mg.) is dissolved in acetic anhydride (5 ml.), and the solution is refluxed for 5 hours. The bulk of the solvent is evaporated in vacuo, and the black oily residue is treated with wataer (7.5 ml.) on the steambath for 1 hour. The oil is extracted into methylene chloride, the solution dried over anhydrous $MgSO_4$, and evaporated in vacuo. The residue is a thick, black gum which is triturated with ether/acetone to give a dark grey-brown solid (295 mg.). The solid material is crystallized from methanol/acetone, giving tan-colored crystals (100 mg.), m.p. ca. 221°–229°, dec., and then is recrystallized from ethanol to obtain pure 3-(N-phenylbenzamido)-2[1H]pyridone (m.p. 217°–222°).

EXAMPLE 11

3-Anilino-2[1H]Pyridone 3-(N-Phenylbenzamido)-2[1H]pyridone (435 mg.) is suspended in a mixture of 2.5 N aqueous NaOH (3 ml.) and water (12 ml.), and the mixture is heated at reflux for 4 hours. Undissolved solid is removed by gravity filtration of the hot reaction mixture. The filtrate is adjusted to a pH of approximately 6 with dilute HCl, and allowed to cool. The precipitated pale green, shiny crystalline solid is collected by filtration at the pump and washed thoroughly with water, and is then recrystallized from acetone (ca. 5 ml.) to give 3-anilino-2[1H]pyridone (m.p. 168.5°–169.5°).

EXAMPLE 12

β-Phenyl-α-3-pyridylacrylic acid

The procedure of J. A. T. Beard and A. R. Katritzky, Rec. Trav. Chim, 78, 592 (1959) is followed; the reaction temperature is ca. 110°–120° and total reaction time is 100 hours. The dark solution is treated with a solution of sodium hydroxide (6 g.) in water (300 ml.), and the whole evaporated in vacuo to a volume of ca. 25 ml. to remove pyridine. The residue is diluted with water to a volume of 125 ml., the solution is filtered through a pad of glass wool to remove some dark insoluble material, and the filtrate acidified with acetic acid. The precipitated tan solid is collected by filtration, and washed thoroughly with water and then is recrystallized from ethanol to give β-phenyl-α-3-pyridylacrylic acid (m.p. 231°–4°, dec.).

EXAMPLE 13 trans-3-Styrylpyridine

Decarboxylation of β-phenyl-α-3-pyridylacrylic acid is carried out by heating 3 g. of the compound at 250° in a Wood's metal-bath until evolution of $CO_2$ ceases (ca. 1 hour). Then the temperature is raised during 10 minutes to 280°–285°, held in that range for a few minutes, and then allowed to cool to room temperature. The dark residue is taken up in ether (150 ml.), the solution is filtered from a small quantity of insoluble material, and then extracted with 2 N HCl (120 ml.). The aqueous extract is washed with ether (50 ml.), and then made basic by the addition of ammonia. The separated dark brown oil is extracted into ether (1 × 150 ml., 1 × 50 ml.), the ethereal solution dried over anhydrous magnesium sulfate, treated briefly with Darco (0.2 g.), filtered, and evaporated in vacuo. The residue is triturated with cyclohexane and the solid collected by filtration and washed thoroughly with cyclohexane. Recrystallization from cyclohexane gives pure trans-3-styrylpyridine, (m.p. 78°–9°).

EXAMPLE 14 trans-3-Styrylpyridine-N-Oxide

The procedure of A. R. Katritzky and A. M. Monro, J. Chem. Soc., 150 (1958) is followed, using 3 ml. of acetic acid, 0.75 ml. of 30 percent hydrogen peroxide and 906 mg. of trans-3-styrylpyridine. Work-up, as described, gives trans-3-styrylpyridine-N-oxide as a dark brown oil which can not be induced to crystallize. The product is characterized by conversion to trans-3-styrylpyridine-N-oxide picrate (m.p. 186°–190°).

EXAMPLE 15 trans-3-Styryl-2[1H]Pyridone

Rearrangement of trans-3-styrylpyridine-N-oxide is carried out according to Example 3. 1.87 Grams of trans-3-styrylpyridine-N-oxide is dissolved in acetic anhydride (10 ml.), and the solution is refluxed for 5 hours. Removal of the bulk of the solvent in vacuo gives a black, oily residue; this is treated with water (20 ml.), and the mixture is heated for 1 hour on the steam-bath. On cooling, the oil sets to a black tacky solid; the solid is collected by filtration, and washed thoroughly with water and then, by slurrying, with acetone. This procedure leaves a pale green crystalline residue (390 mg.) on the filter, which is recrystallized from the minimum quantity of hot methanol to obtain trans-3-styryl-2[1H]pyridone (m.p. 261°–5°).

EXAMPLE 16 cis-β-Carboxy-3-Stilbazole

The procedure of F. H. Clarke, G. A. Felock, G. B. Silverman and C. M. Watnick, J. Org. Chem., 27, 533 (1962) is employed. A mixture of 3-pyridinealdehyde (21.4 g.), phenylacetic acid (27.2 g.), triethylamine (20.2 g.), and acetic anhydride (160 ml.) is stirred under reflux for 2 hours. The resulting dark solution is then allowed to cool to 90°, and cold water (100 ml.) is added dropwise over ca. 10 minutes at a rate that maintains the temperature >90°. The solution is filtered hot, the filter washed with water (50 ml.), and the combined filtrate and washings set aside to cool.

The product separates from the solution as brown needles which are collected by filtration, and washed with 50 percent acetic acid (50 ml.) and water (200 ml.). Recrystallization from ethanol (ca. 350 ml.) gives cis-β-carboxy-3-stilbazole (m.p. 194°–195°).

EXAMPLE 17 cis-3-Stilbazole cis-β-Carboxy-3-stilbazole (11.3 g.) is added in small portions during ca. 15 minutes to a stirred suspension of copper chromite (1.2 g.) in quinoline (25 ml.) maintained at 230° by immersion in an oil-bath. Stirring is then continued for an additional 30 minutes at 230°–235°. The mixture is cooled, filtered, and distilled in vacuo to obtain pure cis-3-stilbazole (b.p. 111°–113°/0,65 mm.).

EXAMPLE 18 cis-3-Styrylpyridine-N-Oxide

Following the procedure of Example 14, but substituting 1.8 g. of cis-3-stilbazole, there is recovered cis-3-styrylpyridine-N-oxide.

EXAMPLE 19 cis-3-Styryl-2[1H]Pyridone

The procedure of Example 15 is followed using the cis-3-styrylpyridine-N-oxide. The total product isolated following digestion with hot water is a black gum (2.0 g.) which is then chromatographed on silica gel. The column is developed with methylene chloride and eluted with 40:1 v/v methylene chloride/methanol to obtain cis-3-styryl-2[1H]pyridone.

EXAMPLE 20

3-Phenethylpyridine

To a solution of 0.2 m. of 3-styrylpyridine in 40 ml. of methanol is added 0.2 g. of platinum oxide catalyst. This mixture is then reduced with hydrogen at room temperature and 40 lb./in.$^2$ pressure. The reaction mixture is then filtered through a pad of filter cel and concentrated to dryness to obtain 3-phenethylpyridine.

EXAMPLE 21

3-Phenethylpyridine-N-Oxide

Following the procedure of Example 5, but substituting an equimolar amount of 3-phenethylpyridine, there is obtained 3-phenethylpyridine-N-oxide.

EXAMPLE 22

3-Phenethyl-2[1H]Pyridone

The procedure of Example 6 is followed using the 3-phenethylpyridine-N-oxide. The product obtained is 3-phenethyl-2[1H]pyridone.

EXAMPLE 23

3-Phenylethynylpyridine

To an ice-cooled solution of bromine (11 ml.) in 50 ml. of carbon tetrachloride is added dropwise with vigorous stirring, a solution of 3-styrylpyridine (0.20 mole) in 40 ml. of carbon tetrachloride. The solution is then decanted from any gummy by-products and evaporated under reduced pressure at 40° to yield crude 3-(α, β-dibromophenethyl)pyridine.

The crude dibromide in 30 ml. of t-butyl alcohol is added, in a stream of nitrogen, over a 30 minute period to powdered potassium hydroxide (20 g.) in vigorously stirring, refluxing t-butyl alcohol (100 ml.) containing hydroquinone (1 g.). After addition is complete, the solution is stirred and refluxed for 1 ½ hours, diluted with 100 mll of ether and filtered from an amorphous black solid. The filtrate is washed with water and the aqueous phase extracted twice with ether. The combined ether solutions are washed with water, dried, and evaporated to dryness in vacuo. The residue is then distilled to obtain 3-phenylethynylpyridine.

EXAMPLE 24

3-Phenylethynylpyridine-N-Oxide

Following the procedure of Example 14, but substituting an equimolar amount of 3-phenylethynylpyridine, there is obtained 3-phenylethynylpyridine-N-oxide.

EXAMPLE 25

3-Phenylethynyl-2[1H]Pyridone

The procedure of Example 15 is followed using the 3-phenylethynylpyridine-N-oxide. The product is a black gum which is then chromatographed on a silica gel column using 50:1 v/v methylene chloride/methanol to obtain 3-phenylethynyl-2[1H]pyridone.

EXAMPLE 26

3-Phenylthio-2[1H]pyridone

A slurry of 0.2 moles of 3-bromo-2[1H]pyridone, 0.22 mole of cuprous thiophenol and 120 ml. of 2,4-lutidine are heated at 155°–165° for 24 hours. The lutidine is removed by distillation under reduced pressure and the residue is taken up in 400 ml. of 10 percent aqueous sodium hydroxide. The insoluble material is removed by filtration. The filtrate is extracted with benzene and the aqueous solution brought to pH 7 with concentrated hydrochloric acid. The resulting mixture is continuously extracted with chloroform for 24 hours. The chloroform extracts are combined and concentrated in vacuo. The residue is dissolved in chloroform and chromatographed on an aluminum column using chloroform as the eluant to obtain 3-phenylthio-2[1H]pyridone.

EXAMPLE 27

3-Phenylsulfinyl-2[1H]pyridone

3-Phenylthio-2[1H]pyridone (0.25 mole) is mixed with 100 ml. of glacial acetic acid and 0.25 mole (28.3 g.) of hydrogen peroxide added as a 30 percent aqueous solution. The addition is carried out portionwise with stirring and the reaction mixture is then refluxed for 4 hours, cooled, and the glacial acetic acid removed under reduced pressure to obtain 3-phenylsulfinyl-2[1H]pyridone.

EXAMPLE 28

3-Phenylsulfonyl-2[1H]pyridone

When the above procedure is followed, but 0.50 mole of hydrogen peroxide is used, the product obtained is 3-phenylsulfonyl-2[1H]pyridone.

PREPARATION OF N-SUBSTITUTED PRODUCTS

Example 29

1-(2-Propynyl)-trans-3-(o-chlorostyryl)-2[1H]pyridone

To 5.75 g. of trans-3-(o-chlorostyryl)-2[1H]pyridone dissolved in 100 ml. of dimethylformamide is added 1.25 g. of sodium hydride. This is heated at 45°C for 2 ½ hours and ice-cooled. To the reaction mixture is then added 3.57 g. of 1-bromo-2-propyne. The reaction mixture is then stirred at room temperature for 10 hours. 200 ml. of ice-water is then added, followed by 3 ml. of 2.5 N HCl. The solid is then filtered and washed with ice-water. The product is recrystallized to obtain pure 1-(2-propynyl)-trans-3-(o-chlorostyryl)-2[1H]pyridone.

b. When an equimolar amount of the reactants of the table below are used in place of 1-bromo-2-propyne in the above procedure, the corresponding N-substituted product is obtained.

methyl iodide
2-butenyl bromide
4-pentenyl bromide
methallyl bromide
1-bromo-3-pentyne
benzyl chloride
phenethyl bromide
1-bromo-3-phenyl-2-propene
hydroxyethyl bromide
β-diethylaminoethyl bromide
aminopropyl bromide
methylaminopropyl bromide c. Following the above procedure, but substituting an equimolar amount of the 2-pyridones and 2-thiopyridones (except the 3-anilinopyridones) of this invention, the corresponding 1-substituted -2-pyridone and 2-thiopyridone products are obtained.

1-Phenyl-trans-3-(o-chlorostyryl-2[1H]pyridone d. To 0.025 m. of trans-3-(o-chlorostyryl)-2[1H]pyridone, dissolved in 100 ml. of benzene, is added 1.25 g. of sodium hydride. The reaction mixture is heated to ca. 45°C., with stirring, for 8 hours, and then kept at room temperature for 15 hours. The mixture is then centrifuged and the gel-like N-sodio compound dried in an Abderhalden. This is then added to 5 ml. of iodobenzene and 0.3 g. of copper metal and heated rapidly to 120±2°C. for 35 minutes and then allowed to cool slowly to room temperature. Dry chloroform is then added to a volume of about 50 ml.; this is then allowed to stir, filtered, and the filter cake washed with chloroform. The chloroform is evaporated to dryness and the residue chromatographed on 300 g. of silica gel using 10–80 percent ether-petroleum ether to obtain 1-phenyl-trans-3-(o-chlorostyryl)-2[[1H]pyridone.

e. In a similar manner, the 3-substituted -2[1H]pyridones and 3-substituted-2[1H]thiopyridones (except the 3-anilinopyridones) of this invention may be converted to the desired 1-phenyl-3-substituted-2[1H]pyridones and 1-phenyl-3-substituted -2[1H]thiopyridones of this invention.

f. When an equimolar amount of a substituted iodobenzene compound is used (such as p-chloroiodobenzene or p-nitroiodobenzene) in place of iodobenzene, the corresponding N-(substituted phenyl) product is obtained.

g. When the 3-(N-substituted)anilino product is desired, the following procedures may be used:
1. When only a R″ substituent is desired (no R₁ substituent), Examples 7–10 may be followed and the desired R″ substituent introduced at Example 8. Such substituent may be those of Example 29b.
2. When only a R₁ substituent is desired (no R″ substituent), Examples 7–10 may be followed and introducing an acyl substituent as R″ in Example 8. Examples 29a, b or 29d, f, may then be followed to introduce the desired R₁ group. The acyl, R″ group is then removed according to Example 11.
3. When both R″ and R₁ substituents are desired but are dissimilar, Examples 7–10 may be followed and the desired R″ substituent introduced at Example 8. The R₁ substituent is then introduced by Examples 29a, b or 29d, f.

4. When both R″ and R₁ substituents are desired and are similar, Example 29c may be followed using two moles of reactant.

PREPARATION OF THIOPYRIDONES

Example 30 trans-3-(o-Chlorostyryl)-2[1H]Thiopyridone

A. β-(o-Chlorophenyl)-α-3-Pyridylacrylic Acid

The procedure of J. A. T. Beard and A. R. Katritzky, Rec. Trav. Chim., 78, 592 (1959) is followed using a total reaction time of 88 hours and a temperature of 120°–125°. Work-up in the usual way gives some dark, oily by product which is removed by extraction into ether (50 ml.) before acidification of the aqueous phase with acetic acid. The acidification gives a yellow solid which is collected by filtration, washed thoroughly with water, dried, and recrystallized from ethanol to give β-(o-chlorophenyl)-α-3-pyridylacrylic acid (m.p. 238°–242° dec.).

B. trans-3-(2′-Chlorostyryl)Pyridine

Decarboxylation of β-(o-chlorophenyl)-α-3-pyridylacrylic acid (2.3 g.) is carried out according to Example 15. The dark, oily residue is treated with ether (100 ml.), the solution filtered from a small quantity of insoluble material, dried over anhydrous magnesium sulfate, and evaporated in vacuo. The residue (1.7 g.) is dissolved in nitrobenzene 110 ml.), a few crystals of iodine are added, and the solution is then heated at reflux for 20 minutes.

The cooled reaction mixture is diluted with ether (100 ml.), and extracted with 2.5 N hydrochloric acid (80 ml.). The aqueous phase is washed with ether (50 ml.), and then made alkaline by the addition dropwise of concentrated ammonia. The separated brown oil is extracted into ether (2 × 50 ml.), the combined extracts dried, and evaporated. Pure trans-isomer is isolated via its crystalline hydrochloride salt; when the total crude oil (1.5 g.) in ether solution (ca. 50 ml.) is treated with ethereal hydrogen chloride there is recovered 1.8 g. (78 percent) of light tan solid hydrochloride, m.p. 198°–204°. Recrystallization of the crude solid from methanol/ether gives trans-3-(o-chlorostyryl)pyridine hydrochloride (m.p. 203°–211°).

C. trans-3-(o-Chlorostyryl)Pyridine-N-Oxide

Conversion of trans-3-(o-chlorostyryl)pyridine (750 mg.) is carried out according to Example 14 in 2 ml. of acetic acid with 0.3 ml. of hydrogen peroxide, followed by 0.22 ml. of additional hydrogen peroxide after 3 hours. The solution is kept at 75°–80° for 18 hours. Work-up in the usual way gives ca. 950 mg. of trans-3-(o-chlorostyryl)pyridine-N-oxide, as an oil.

D. trans-3-(o-Chlorostyryl)-2[1H]Pyridone

The N-oxide (525 mg., 2.3 moles) is dissolved in acetic anhydride (5 ml.), and the solution refluxed for 7 hours. Removal of the bulk of the solvent by evaporation in vacuo, and digestion of the residual dark oil with water (10 ml.) for 1 hour on the steam-bath gives a black, gummy precipitate. The water is decanted and the gum triturated with a little acetone. The yellow, crystalline solid thus obtained is collected by filtration, washed thoroughly with acetone, air-dried, and recrystallized from methanol to obtain trans-3-(o-chlorostyryl-2[1H]pyridone (m.p. 188°–191°).

E. trans 3-(o-Chlorostyryl)-2[1H]Thiopyridone

To 0.11 mole of trans-3-(o-chlorostyryl)-2[1H]pyridone in 75 ml. of dry pyridine is added 0.058 mole of phosphorous pentasulfide suspended in 75 ml. of dry pyridine. The reaction mixture is refluxed for ½ hour. The pyridine is removed in vacuo and the residue pumped dry at room temperature for several hours. The residue is extracted in a Soxhlet with 1,500 ml. benzene and the benzene then evaporated to dryness. The residue is recrystallized from methanol to obtain trans-3-(o-chlorostyryl)-2[1H]thiopyridone.

When an equimolar amount of the pyridones of this invention are used in the above procedure, the corresponding thiopyridones are obtained.

The following representative examples illustrate the interconversion of functional groups which can be accomplished at various stages of the preparation of the final products.

EXAMPLE 31

3-(p-Aminophenoxy)-2[1H]Pyridone

A mixture of pure 3-(p-nitrophenoxy)-2[1H]pyridone (0.01 mole) in methanol-dioxane (1:1) (ca. 200 ml.) is reacted with hydrogen at room temperature (40 p.s.i.) in the presence of 10 percent palladium-on-carbon (1.0 g.). The mixture is filtered, the cake washed well with methanol, the filtrate evaporated in vacuo, and the residue chromatographed on a silica gel column using a methanol-methylene chloride system (v/v 0–30 percent methanol) as eluant to yield 3-(p-aminophenoxy)-2[1H]pyridone.

EXAMPLE 32

1-Benzyl-3-(p-methylaminophenoxyl)-2[1H]Pyridone

A mixture of 1-benzyl-3(p-aminophenoxy)-2[1H]pyridone (0.05 m.) and 20 ml. of methylformate is heated at reflux for 18 hours. Unreacted methylformate is removed under reduced pressure. The oily residue is dissolved in benzene and extracted with dilute hydrochloric acid to remove any unreacted 1-benzyl-3-(p-aminophenoxy-2[1H]pyridone. After washing with water, the benzene extract is dried over anhdyrous sodium sulfate, filtered, and concentrated to give 1-benzyl-3-(p-formylaminophenoxy)-2[1H]pyridone.

Reduction of this amide in ethyl ether with excess lithium aluminum hydride and isolation of the product in the usual manner gives 1-benzyl-3-(p-methylaminophenoxy)-2[1H]pyridone.

EXAMPLE 33

1-Methyl-3(p-Dimethylaminophenoxy)-2[1H]Thiopyridone

A solution of 0.005 mole of 1-methyl-3-(p-nitrophenoxy)-2[1H]thiopyridone and 1.6 ml. of 37 percent formaldehyde in 50 ml. of methanol is hydrogenated over 0.5 gram of 5 percent palladium-on-charcoal under 42 lbs. of hydrogen pressure until 5 equivalents of hydrogen is absorbed. The catalyst is filtered off and the filtrate is evaporated in vacuo. The residue is dissolved in absolute alcohol, treated with hydrogen chloride gas and then evaporated to dryness to obtain 1-methyl-3-(p-dimethylaminophenoxy)-2[1H]thiopyridone.

EXAMPLE 34

3-(p-Hydroxyphenoxy)-2[1H]Pyridone

A mixture of 3-(p-aminophenoxy)-2[1H]pyridone (0.2 mole), water (600 ml.) and concentrated sulfuric acid (25 ml.) is cooled to 10°C. and a solution of sodium nitrite (0.21 mole) in a minimum of water is added gradually. When the presence of free nitrous acid is detected (starch-iodide paper), the addition is stopped and the diazotization mixture is allowed to warm to room temperature, then heated on a steam-bath until there is no more nitrogen evolution. The mixture is cooled, extracted well with chloroform, the combined chloroform layers dried, concentrated to a residue and methanol (300 ml.) added, plus 0.5 ml. of concentrated sulfuric acid. The mixture is heated gently for several hours, concentrated in vacuo to remove most of the methanol and extracted with chloroform. The chloroform is dried, filtered and concentrated to a residue. Chromatography of the residue on a silica gel column using an ether-petroleum ether (v/v 0–100 percent ether) system as eluant yields 3-(p-hydroxyphenoxy-2[1H]pyridone.

EXAMPLE 35

3Chlorophenoxy

To 3-(p-aminophenoxy)pyridine (0.014 mole) suspended in 125 ml. of 80 percent hydrochloric acid and cooled to 0°C., is added dropwise a solution of 1.17 grams of sodium nitrite in 15 ml. of water. After about 10 minutes, a solution of 8.42 grams of cuprous chloride in 200 ml. of 50 percent hydrochloric acid is added portionwise and stirred for 15 hours. The reaction mixture is then poured onto ice-water and extracted with chloroform. This is dried over sodium sulfate and concentrated in vacuo to a solid which is chromatographed on silica gel; elution with etherpetroleum ether (15–25 percent) gives 3-(p-chlorophenoxy)-pyridine.

EXAMPLE 36

When the procedures of Examples 1–35 are followed but substituting the appropriate starting materials the following products may be prepared:

| Product | Starting Material | Procedure |
|---|---|---|
| 3-(p-methylphenoxy-2[1H]pyridone | 3-(p-methylphenoxy)pyridine | Examples 1–3 |
| 3-(p-chlorophenoxy)-2[1H]pyridone | 3-(p-chlorophenoxy)pyridine | Examples 1–3 |
| 3-(p-methoxyphenoxy)-2[1H]pyridone | 3-(p-methoxyphenoxy)pyridine | Examples 1–3 |
| 3-(p-hydroxyphenoxy)-2[1H]pyridone | 3-(p-aminophenoxy-2[1H]pyridone | Example 34 |
| 3-(p-nitrophenoxy-2[1H]pyridone | 3-(p-nitrophenoxy)pyridine | Examples 1–3 |
| 3-(o-nitrophenoxy)-2[1H]pyridone | 3-(o-nitrophenoxy)pyridine | Examples 1–3 |
| 3-(p-trifluoromethylphenoxy)-2[1H]-pyridone | 3-(p-trifluoromethylphenoxy)pyridine | Examples 1–3 |
| 3-(p-biphenyloxy-2[1H]pyridone | | |
| 3-(m,m′,p-trimethoxyphenoxy)-2[1H -pyridone | 3-(m,m′,p-trimethoxyphenoxy)pyridine | Examples 1–3<br>Examples –3 |
| 3-(o-aminophenoxy)-2[1H]pyridone | 3-(o-nitrophenoxy)-2[1H]pyridone | Example 31 |
| 1-phenyl-3-(p-methylaminophenoxy)-2[1H]pyridone | 1-phenyl-3-(p-aminophenoxy)-2[1H]-pyridone | Example 32 |
| 1-(β-dimethylaminoethyl)-3-(p-dimethylaminophenoxy)-2[1H]pyridone | 1-(β-dimethylaminoethyl-3-(p-nitro-phenoxy)-2[1H]pyridone | Example 33 |
| 3-(o,o′-dichlorophenoxy)-2[1H]pyridone | 3-(o,o′-dichlorophenoxy)pyridine | Examples 1–3 |
| 3-)o-tolyloxy)-2[1H]pyridone | 3-(o-tolyloxy)pyridine | Examples 1–3 |

| Product | Starting Material | Procedure |
|---|---|---|
| 1-methyl-3-phenoxy-2[1H]pyridone | 3-phenoxy-2[1H]pyridone | Examples 29 b,c |
| 1-methallyl-3-phenoxy-2-[1H]pyridone | 3-phenoxy-2[1H]pyridone | Example 29 b,c |
| 1-(3-pentynyl)-3-phenoxy-2[1H]pyridone | 3-phenoxy-2[1H]pyridone | Example 29 b,c |
| 1-phenyl-3-(p-nitrophenoxy-2[1H]-pyridone | 3-(p-nitrophenoxy-2[1H]pyridone | Example 29 d,e |
| 1-(p-chlorophenyl)-3-(p-methylphenoxy)-2[1H]pyridone | 3-(p-methylphenoxy)-2[1H]pyridone | Example 29 f |
| 1-(β-hydroxyethyl)-3-phenoxy-2[1H]-pyridone | 3-phenoxy-2[1H]pyridone | Example 29 b,c |
| 1-(β-aminoethyl)-3-phenoxy-2[1H]pyridone | 3-phenoxy-2[1H]pyridone | Example 29 b,c |
| 1-(β-dimethylaminoethyl)-3-phenoxy-2[1H]pyridone | 3-phenoxy-2[1H]pyridone | Example 29 b,c |
| 4-methyl-3-phenoxy-2[1H]pyridone | 4-methyl-3-phenoxypyridine | Examples 1–3 |
| 6-methyl-3-(p-chlorophenoxy)-2[1H]pyridone | 6-methyl-3-(p-chlorophenoxy)pyridine | Examples 1–3 |
| 1-benzyl-3-(p-chlorobenzyl)-2[1H]-pyridone | 3-(p-chlorobenzyl)pyridine | Examples 4–6, 31 b,c |
| 3-(p-trifluoromethylbenzyl)-2[1H]-pyridone | 3-(ptrifluoromethylbenzyl)pyridine | Examples 4–6 |
| 1-methallyl-3-(p-phenylbenzyl)-2-[1H]pyridone | 3-(p-phenylbenzyl)pyridine | Examples 4–6, 29 b,c |
| 1-phenyl-3-(p-aminobenzyl)-2[1H]pyridone | 3-(p-nitrobenzyl)-2[1H]pyridone | Examples 29 d, e, 33 |
| 1-(β-dimethylaminoethyl)-3-(p-methoxybenzyl)-2[1H]pyridone | 3-(p-methoxybenzyl)pyridine | Examples 4–6, 29 b,c |
| 3-(p-chloropyenethyl)-2[1H]pyridone | 3-(p-chlorophenethyl)pyridine | Examples 20–22 |
| 1-benzyl-3-(p-nitrophenethyl)-2[1H]-pyridone | 3-(p-nitrophenethyl)pyridine | Examples 20–22, 31 b,c |
| trans-3-(p-nitrostyryl)-2[1H]pyridone | trans-3-(p-nitrostyryl)pyridine | Examples 12–15 |
| cis-3-(p-nitrostyryl)-2[1H]pyridone | cis-3-(p-nitrostyryl)pyridine | Examples 16–19 |
| 1-(β-dimethylaminoethyl)-3-(p-methoxystyryl)-2[1H]pyridone | 3-(p-methoxystyryl)pyridine | Examples 12–19, 29 b,c |
| 3-(p-hydroxystyryl)-2[1H]pyridone | 3-(p-aminostyryl)-2[1H]pyridone | Examples 12–19, 34 |
| 3-(p-dimethylaminostyryl)-2[1H]pyridone | 3-(p-nitrostyryl)-2[1H]pyridone | Examples 12–19, |
| 1-benzyl-3-(p-trifluoromethylstyryl)-2[1H]pyridone | 3-(p-trifluoromethylstyryl)pyridine | Examples 12–19, 29 b,c |
| 1-methyl-3-(p-nitrophenylthio-2[1H]-pyridone | 3-(p-nitrophenylthio)-2[1H]pyridone | Examples 26, 29 b,c |
| 1-methyl-3-(p-nitroanilino)-2[1H]pyridone | 3-(p-nitroanilino)pyridine | Examples 7–10, 29 a, b, 11 |
| 3-(o-methylanilino)-2[1H]pyridone | 3-(o-methylanilino)pyridine | Examples 7–11 |
| 3-(N-methylanilino)-2[1H]pyridone | 3-anilinopyridine | Examples 7–10 |
| 1-(β-dimethylaminoethyl)-3-(N-phenylbenzamido)-2[1H]pyridone | 3-(N-phenylbeenzamido)-2[1H]pyridone | Example 29a, b |
| 3-(N-acetyl-p-nitroanilino)-2[1H]-pyridone | 3-(p-nitroanilino)pyridine | Examples 7–10 |
| 3-(p-chlorophenylethynyl)-2[1H]pyridone | p-chlorophenyl-(3-pyridyl)acetylene | Examples 23–25 |
| 1,4-dimethyl-3-phenoxy-2[1H]pyridone | 4-methyl-3-phenoxypyridine | Examples 1–3, 29 b,c |
| 3-phenoxy-2[1H]thiopyridone | 3-phenoxy-2[1H]pyridone | Example 30 E |
| 4-methyl-3-phenoxy-2[1H]thiopyridone | 4-methyl-3-phenoxy-2[1H]pyriodone | Example 30 E |
| 3-benzyl-2[1H]thiopyridone | 3-benzyl-2[1H]pyridone | Example 30 E |
| 3-benzoyl-2[1H]thiopyridone | 3-benzoyl-2[1H]pyridone | Example 30 E |
| 3-(N-phenylbenzamido)-2[1H]thiopyridone | 3-(N-phenylbenzamido-2[1H]pyridone | Example 30 E |
| 3-anilino-2[1H]thiopyridone | 3-anilino-2[1H]pyridone | Example 30 E |
| trans-3-styryl-2[1H]thiopyridone | trans-3-styryl-2[1H]pyridone | Example 30 E |
| cis-3-styryl-2[1H]thiopyridone | cis-3-styryl-2[1H]pyridone | Example 30 E |
| 3-phenethyl-2[1H]thiopyridone | 3-phenethyl-2[1H]pyridone | Example 30 E |
| 3-phenylethynyl-2[1H]thiopyridone | 3-phenylethynyl-2[1H]pyridone | Example 30 E |
| 3-phenylthio-2[1H]thiopyridone | 3-phenylthio-2[1H]pyridone | Example 30 E |
| 3-phenysulfinyl-2[1H]thiopyridone | 3-phenylsulfinyl-2[1H]pyridone | Example 30 E |
| 3-phenylsulfonyl-2[1H]thiopyridone | 3-phenylsulfonyl-2[1H]pyridone | Example 30 E |
| 1-(2-propynyl)-trans-3-(o-chorostyryl)-2[1H]thiopyridone | 1-(2-propynyl)-trans-3-(o-chlorostyryl)-2[1H]pyridone | Example 30 E |
| 1-phenyl-trans-3-(o-chlorostyryl)-2[1H]thiopyridone | 1-phenyl-trans-3-(o-chlorostyryl)-2[1H]pyridone | Example 30 E |
| 1,4-dimethyl-3-phenoxy-2[1H]thiopyridone | 1,4-dimethyl-3-phenoxy-2[1H]pyridone | Example 30 E |

The following examples, are representative of the compositions of this invention.

EXAMPLE 37

A mixture of 25, 100 or 500 parts of trans-3-(o-chlorostyryl(2[1H]pyridone and 25 parts of lactose is granulated with suitable water, and to this is added 100 parts of maize starch. The mass is passed through a 16 mesh screen. The granules are dried at a temperature below 60°C. The dry granules are passed through a 16 mesh screen, and mixed with 3.8 parts of magnesium stearate. They are then compressed into tablets suitable for oral administration.

EXAMPLE 38

A mixture of 50 parts of 3-phenoxy-2[1H]pyridone, 3 parts of the calcium salt of lignin sulphonic acid, and 237 parts of water is ball-milled until the size of substantially all of the particles of the sulfone is less than 10 microns. The suspension is diluted with a solution containing 3 parts of sodium carboxymethyl cellulose and 0.9 part of the butyl ester of p-hydroxy benzoic acid in 300 parts of water. There is thus obtained an aqueous suspension suitable for oral administration for therapeutic purposes.

We claim:

1. A method of treating a disease exhibiting the symptoms of pain, fever or inflammation in a human or animal which comprises the administration of about 0.5 mg./kg. to about 70 mg./kg. per day in dosage unit form of a compound of the formula:

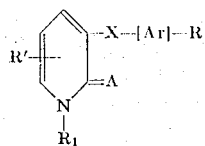

where
  A is O or S;
  Ar is phenyl;
  R is hydrogen, loweralkyl, halogen, hydroxy, loweralkoxy, haloloweralkyl, phenyl, naphthyl, nitro, amino, acetylamino, loweralkylamino or diloweralkylamino;
  R' is hydrogen or loweralkyl;
X is
  —$CH_2$—
  —$CH_2$—$CH_2$—
  —CH=CH— or
  —C≡C—; and
$R_1$ is hydrogen, loweralkyl, loweralkenyl, loweralkynyl, phenyl loweralkyl, phenyl, hydroxyloweralkyl, aminoloweralkyl, or diloweralkylamino-loweralkyl; or a nontoxic pharmaceutically acceptable salt.

2. The method of claim 1 wherein A is O.

3. The method of claim 1 wherein X is —CH=CH—.

4. The method of claim 1 wherein A is O and X is —CH=CH—.

5. A method according to claim 1 where
  A is O;
  Ar is phenyl;
  R is hydrogen, loweralkyl, halogen, hydroxy, loweralkoxy, haloloweralkyl, nitro, amino, loweralkylamino or lowerdialkylamino;
  R' is hydrogen;
  X is —CH=CH—; and
  $R_1$ is hydrogen, loweralkyl, phenyl loweralkyl, phenyl, or lowerdialkylaminoloweralkyl.

6. A method according to claim 5 where R and $R_1$ are each hydrogen, thus administering 3-styryl-2[1H]pyridone.

7. A method according to claim 1 where
  A is O;
  Ar is phenyl;
  R is halogen;
  X is —CH=CH—; and
  $R_2$ is hydrogen.

8. A method according to claim 5 where R is o-chloro, and $R_1$ is hydrogen thus administering 3-(o-chlorostyryl)-2[1H]-pyridone.

* * * * *